United States Patent
Leogrande et al.

(10) Patent No.: US 9,755,942 B2
(45) Date of Patent: Sep. 5, 2017

(54) METHOD AND SYSTEM FOR MONITORING CONDITIONS IN A DYNAMIC NETWORK ENVIRONMENT

(71) Applicant: Nicira, Inc., Palo Alto, CA (US)

(72) Inventors: Marco Leogrande, Sunnyvale, CA (US); Pere Monclus, San Jose, CA (US); Awais Nemat, San Jose, CA (US); Sushil Singh, Mountain View, CA (US)

(73) Assignee: VMware, Inc., Palo Alto, CA (US)

(*) Notice: Subject to any disclaimer, the term of this patent is extended or adjusted under 35 U.S.C. 154(b) by 457 days.

(21) Appl. No.: 14/063,914

(22) Filed: Oct. 25, 2013

(65) Prior Publication Data
US 2015/0120905 A1    Apr. 30, 2015

(51) Int. Cl.
*H04L 12/26* (2006.01)
*H04L 12/24* (2006.01)
*H04L 29/06* (2006.01)

(52) U.S. Cl.
CPC .......... *H04L 43/14* (2013.01); *H04L 41/0681* (2013.01); *H04L 43/04* (2013.01);
(Continued)

(58) Field of Classification Search
CPC ....... H04L 43/00; H04L 43/02; H04L 43/026; H04L 43/028; H04L 43/04; H04L 43/045; H04L 43/12; H04L 41/08; H04L 41/0803; H04L 41/0806; H04L 41/0813; H04L 41/0681; H04L 41/06; H04L 41/0604;
(Continued)

(56) References Cited

U.S. PATENT DOCUMENTS 6,321,338 B1 * 11/2001 Porras ................... H04L 41/142
709/224
6,336,139 B1 *  1/2002 Feridun .................. G06F 9/542
709/224

(Continued)

OTHER PUBLICATIONS

Kata et al., "Logic Programming for Software-Defined Networks," Workshop on Cross-Model Design and Validation (XLDI), vol. 412, 2012.*

(Continued)

*Primary Examiner* — Vivek Srivastava
*Assistant Examiner* — William C McBeth

(57) ABSTRACT

A method for monitoring network conditions by receiving a first condition definition describing a first network condition to be monitored in a network and an activation definition, determining a network topology of the network, and compiling the first condition definition to generate a first data plane component, a first control plane component, and an activation component. The method also includes deploying the first data plane component into a data plane of the network, where the data plane component captures and synthesizes a first stream of network events to generate a first modified stream of network events. The method also includes deploying the control plane component into a network operating system for the network. The control plane component receives and correlates the first modified stream of network events. The method also includes deploying an activation component that, upon receiving the correlated stream of events, initiates the activation definition.

20 Claims, 8 Drawing Sheets

(52) U.S. Cl.
CPC ............ *H04L 43/045* (2013.01); *H04L 41/12* (2013.01); *H04L 63/1408* (2013.01); *H04L 63/1416* (2013.01)

(58) Field of Classification Search
CPC ... H04L 41/0631; H04L 43/14; H04L 41/046; H04L 41/0618; H04L 41/069; H04L 41/0876; H04L 41/0883; H04L 41/0893; H04L 41/12; H04L 41/20; H04L 63/1408; H04L 63/1416; H04L 63/1425
USPC .................... 709/220, 223, 224, 226, 231
See application file for complete search history.

(56) References Cited

U.S. PATENT DOCUMENTS

| | | | | |
|---|---|---|---|---|
| 7,949,738 | B2* | 5/2011 | Kumar | G06N 5/025 709/223 |
| 8,056,130 | B1* | 11/2011 | Njemanze | G06F 21/55 709/224 |
| 8,190,720 | B1* | 5/2012 | Yellai | H04L 67/34 709/221 |
| 8,593,958 | B2* | 11/2013 | Zhang | H04L 43/026 370/230.1 |
| 8,959,633 | B1* | 2/2015 | Dokey | H04L 63/1408 705/30 |
| 8,966,074 | B1* | 2/2015 | Richards | H04L 43/08 709/224 |
| 9,038,151 | B1* | 5/2015 | Chua | H04L 45/42 709/223 |
| 9,495,234 | B1* | 11/2016 | Hamman | H04L 43/50 |
| 2003/0033519 | A1* | 2/2003 | Buckman | H04L 67/2823 713/153 |
| 2010/0306709 | A1* | 12/2010 | Lynch | G06F 17/30516 715/854 |
| 2011/0085461 | A1* | 4/2011 | Liu | H04L 43/12 370/252 |
| 2011/0131316 | A1* | 6/2011 | Ferris | G06F 11/3006 709/224 |
| 2011/0154119 | A1* | 6/2011 | Wang | H04L 41/0631 714/37 |
| 2011/0196958 | A1* | 8/2011 | Bharadwaj | H04L 67/1097 709/224 |
| 2012/0147898 | A1* | 6/2012 | Koponen | H04L 41/0893 370/422 |
| 2013/0117847 | A1* | 5/2013 | Friedman | H04L 63/1425 726/22 |
| 2013/0246925 | A1* | 9/2013 | Ahuja | H04L 63/20 709/224 |
| 2014/0115654 | A1* | 4/2014 | Rogers | H04L 63/0218 726/1 |
| 2014/0259093 | A1* | 9/2014 | Narayanaswamy | H04L 63/1425 726/1 |
| 2014/0280834 | A1* | 9/2014 | Medved | H04L 43/16 709/223 |
| 2014/0280893 | A1* | 9/2014 | Pfeifer | H04L 43/04 709/224 |

OTHER PUBLICATIONS

Shin et al., "Avant-Guard—Scalable and Vigilant Switch Flow Management in Software-Defined Networks," Proceedings of the 2013 ACM SIGSAC Conference on Computer & Communications Security, Nov. 4-8, 2013, pp. 413-424.*
Shin et al., "FRESCO—Modular Composable Security Services for Software-Defined Networks", ISOC Network and Distributed System Security Symposium, Feb. 2013.*
WO2013/035342 A1, Mar. 2013, Sonoda et al., WIPO.*
"Network Administrator", Wikipedia, <https://en.wikipedia.org/wiki/Network_administrator>, accessed Jun. 29, 2016.*
Facca et al., "NetIDE: First steps towards an integrated development environment for portable network apps," 2013 Second European Workshop on Software Defined Networks, Oct. 10-11, 2013, pp. 105-110.*
Kelly, "Developing Innovative Embedded Applications in the Network with the Junos SDK", Network-Embedded Management Applications, May 2012, pp. 137-157.*
Kelly et al., "Rapid Service Creation using the JUNOS SDK," ACM SIGCOMM Computer Communication Review, vol. 40, No. 1, Jan. 2010, pp. 56-60.*
Choi et al., "SUMA: Software-defined Unified Monitoring Agent for SDN", 2014 IEEE Network Operations and Management Symposium (NOMS), 2014, pp. 1-5.*

* cited by examiner

METHOD AND SYSTEM FOR MONITORING CONDITIONS IN A DYNAMIC NETWORK ENVIRONMENT

BACKGROUND

Since the inception of computer networks, the size of networks has grown exponentially. Today, any number of computing devices may be connected over a network, and data and services provided by those devices may be accessed from any number of locations. With that growth, the complexity of managing storage solutions across networks has increased.

In traditional computer networks, data paths are implemented by interconnecting switches, routers, and other network devices throughout the network. Traditional computer networks can be too rigid and complex for these new environment requirements. Network virtualization is a set of evolving concepts aiming at allowing network administrators to have control over traffic across the network without physically modifying network devices. Network virtualization is one of the use cases usually associated to software defined networking solutions.

SUMMARY

In general, in one aspect, the invention relates to a method for monitoring network conditions. The method includes receiving a first condition definition describing a first network condition to be monitored in a network and an activation definition, determining a network topology of the network, and compiling the first condition definition to generate a first data plane component, a first control plane component, and an activation component. The method also includes deploying the first data plane component into a data plane of the network, where the data plane component captures a first stream of network events as described in the first condition definition, and synthesizes the first stream of network events to generate a first modified stream of network events. The method also includes deploying the control plane component into a network operating system for the network, where the control plane component receives the first modified stream of network events and correlates the modified stream of events into a correlated stream of events. The method also includes deploying an activation component, where the activation component, upon receiving the correlated stream of events, initiates the activation definition.

In general, in one aspect, the invention relates to a system for monitoring network conditions. The system includes a computer processor and a computer readable storage device. The computer readable storage device includes computer code which, when executed by the computer processor, causes the computer processor to receive a first condition definition describing a first network condition to be monitored in a network and an activation definition, determine a network topology of the network, and compile the first condition definition to generate a first data plane component, a first control plane component, and an activation component. The computer code further causes the processor to deploy the first data plane component into a data plane of the network, where the data plane component captures a first stream of network events as described in the first condition definition, and synthesizes the first stream of network events to generate a first modified stream of network events. The computer code further cause the processor to deploy the control plane component into a network operating system for the network, where the control plane component receives the first modified stream of network events and correlates the modified stream of events into a correlated stream of events. The computer code further causes the processor to deploy an activation component, wherein the activation component, upon receiving the correlated stream of events, initiates the activation definition.

In general, in one aspect, the invention relates to a computer program product for monitoring network conditions. The computer program product includes a computer readable storage device and computer readable code stored on the computer readable storage device and executable by a computer processor to receive a first condition definition describing a first network condition to be monitored in a network and an activation definition, determine a network topology of the network, and compile the first condition definition to generate a first data plane component, a first control plane component, and an activation component. The computer code further causes the processor to deploy the first data plane component into a data plane of the network, where the data plane component captures a first stream of network events as described in the first condition definition, and synthesizes the first stream of network events to generate a first modified stream of network events. The computer code further cause the processor to deploy the control plane component into a network operating system for the network, where the control plane component receives the first modified stream of network events and correlates the modified stream of events into a correlated stream of events. The computer code further causes the processor to deploy an activation component, wherein the activation component, upon receiving the correlated stream of events, initiates the activation definition.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

DETAILED DESCRIPTION

Figure 1:
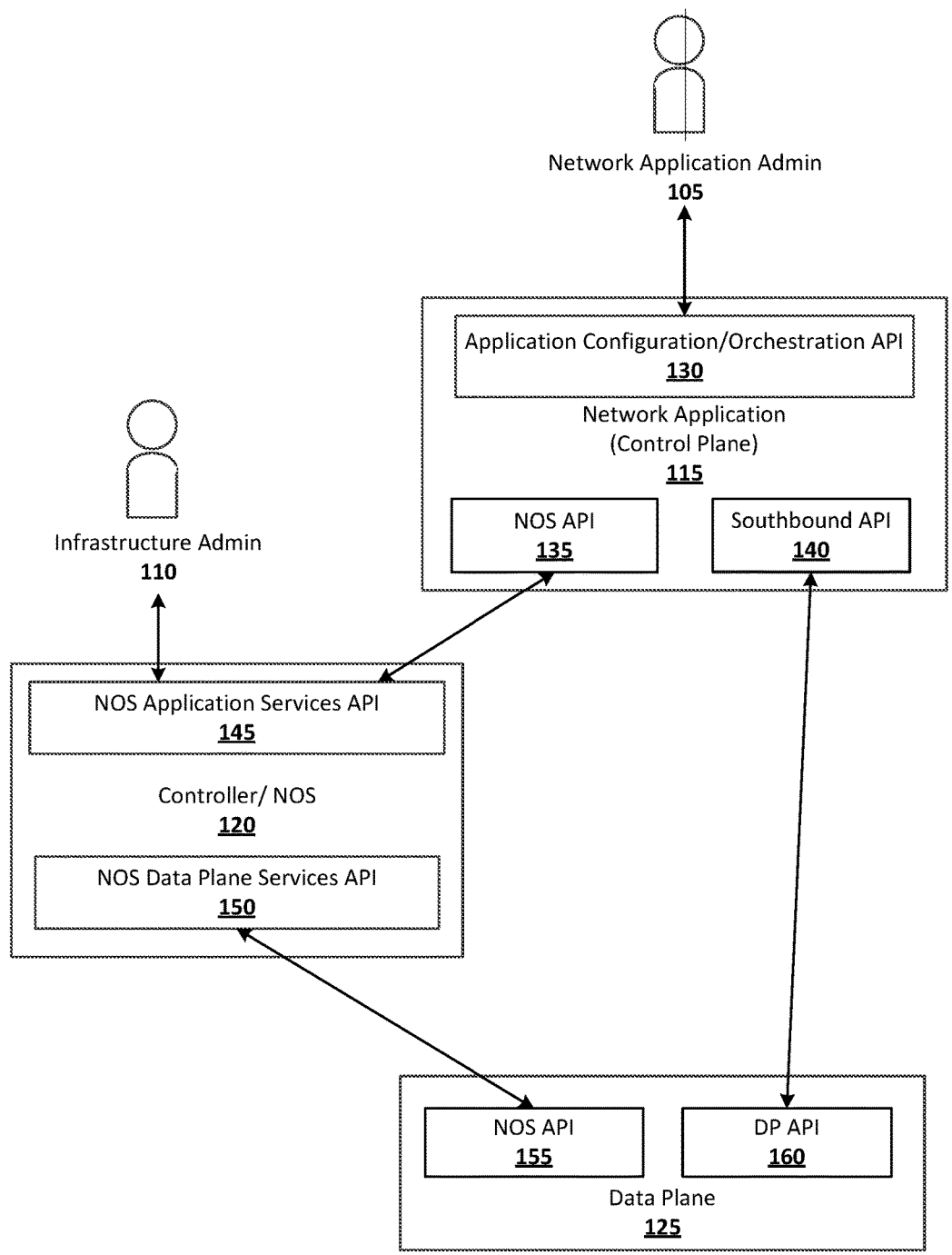
FIG. 1 shows a networking architecture, in which the invention may be practiced, according to one or more embodiments.

In the following detailed description of exemplary embodiments of the invention, specific exemplary embodiments in which the invention may be practiced are described in sufficient detail to enable those skilled in the art to practice the invention. The following detailed description is, therefore, not to be taken in a limiting sense, and the scope of the present invention is defined by the appended claims and equivalents thereof.

The terminology used herein is intended to describe particular embodiments only and is not intended to be limiting of the invention. As used herein, the singular forms "a", "an" and "the" are intended to include the plural forms as well, unless otherwise indicated. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by executable computer program instructions (or computer code). These computer program instructions may be provided to a processor of a general purpose computer, special purpose computer, or other programmable data processing apparatus to produce a machine, such that the instructions, which execute via the processor of the computer or other programmable data processing apparatus, implement the methods/processes/functions/acts specified in the one or more blocks of the flowchart(s) and/or block diagram(s).

These computer program instructions may also be stored in a tangible computer readable storage device that can direct a computer to function in a particular manner, such that the computer readable storage device is an article of manufacture (or computer program product) including instructions which implement the method/process/function/act specified in the one or more blocks of the flowchart(s) and/or block diagram(s). The computer program instructions may also be loaded onto a computer, other programmable data processing apparatus, or other devices to cause a series of operational steps to be performed on the computer, other programmable apparatus or other devices to produce a computer implemented process/method, such that the instructions which execute on the computer or other programmable apparatus implement the method/process/functions/acts specified in one or more blocks of the flowchart(s) and/or block diagram(s).

It is understood that the use of specific component, device and/or parameter names (such as those of the executing utility/logic described herein) are for example only and not meant to imply any limitations on the invention. The invention may thus be implemented with different nomenclature/terminology utilized to describe the components, devices, or parameters herein, without limitation. Each term utilized herein is to be given its broadest interpretation given the context in which that terms is utilized.

Generally, the description is directed to a method for network oversight and triggers an action based on network events in a dynamic network environment. Customizable network components are dynamically generated and distributed to a control plane and a data plane. The customizable network components synthesize and correlate a stream of network events. An activation component determines when a particular configuration of network events occurs, and triggers and activation component. The activation component may include user-defined instruction, and/or a visualization component configured to generate a visualization of the modified stream of network events for display on a display device.

Multiple monitoring conditions can be combined and correlated to provide a unified view, and events may be discarded if they are not of interest based on a monitoring condition definition, or if they are redundant. In addition, the system may provide to the user a summary view of the monitoring events, according to the aggregation, correlation, and visualization policies. Further, the system may be configured to execute a trigger when certain network conditions are met.

In one or more embodiments, the system and method for monitoring network conditions is highly configurable because the high-level statement can define in detail the events to capture, how they should be aggregated and correlated, and which actions, if any, should be executed when network conditions are met. The network topology definition can define in detail where network events should be monitored, and may be defined in terms of physical or logical location. The monitoring of network conditions is also dynamic because it can react to fluctuations in the network and automatically balance the various data plane and control plane components, depending on network activity or other system characteristics. For example, if more processing power is required to handle selected events, or if more data planes are added to the system. In one or more embodiments, upon detecting a change in network topology, the condition definition may be recompiled and re-deployed in real time.

In one or more embodiments, the described system and method for monitoring network conditions is distributed because it balances the aggregation and correlation of network events across multiple entities, both in the data plane and in the control plane. The described system and method for monitoring network conditions is also scalable because it can be applied to any computer network, regardless of its size and, by virtue of being dynamic and distributed, can adapt to different network configurations and to different patterns of network traffic.

FIG. 1 depicts a networking architecture, in which the invention may be practiced, according to one or more embodiments. Specifically, FIG. 1 depicts a network environment in which one or more network administrators may manage network applications, according to one or more embodiments. As depicted, the network includes a network application control plane 115, a network operating system (NOS, or controller) 120, and a data plane 125. Each of control plane 115, data plane 125, and NOS 120 may be stored across one or more computing devices including one or more of a computer processor, memory, and a computer readable storage device including computer code executable by the computer processor. Memory may be random access memory (RAM), cache memory, flash memory, or any other kind of storage structure or device that is configured to store computer instructions/code executable by a computer processor to store data utilized during such execution. The computer readable storage device may be any kind of computer storage device, volatile or non-volatile, such as a hard disk, an optical drive such as a compact disk drive or digital video disk (DVD) drive, and a flash memory drive.

In one or more embodiments, the control plane 115 of the network application includes an orchestration API 130, a network operating system API 135, and a southbound API 140. Each of orchestration API 130, NOS API 135, and southbound API 140 is a programmatic interface that includes computer code executable by a computer processor to allow users or external modules to interoperate with the control plane 115. Specifically, orchestration API 130 allows a user or other management module to communicate with control plane 115. NOS API 135 is a programmatic interface that includes computer code that allows the control plane 115 to communicably connect to a network operating system 135. Southbound API 140 is a programmatic interface that allows the control plane to communicate with the data plane 125 in order to control the behavior of data plane 125.

In one or more embodiments, NOS 120 includes an application services API 145 and a data plane services API 150. Application services API is a programmatic interface that interacts with NOS API 135 to allow NOS 125 to communicate with control plane 115. In addition, in one or more embodiments, NOS Application services API 145 receives instruction from an infrastructure administrator 110, or other management module in the system. NOS data plane services API 150 is a programmatic interface that allows NOS 120 to communicate with data plane 125.

As depicted, data plane 125 includes NOS API 355 and DP API 160. In one or more embodiments, NOS API 155 is a programmatic interface that allows NOS 120 to communicate with data plane 125 via NOS data plane services API 150. DP API 160 is a programmatic interface that allows data pane 125 to receive management instructions from control plane 115 via southbound API 140.

Each of the control plane 115, data plane 125, and NOS 120 may be managed by one or more human or mechanical administrators. As depicted, network application admin 105 manages the control plane 115, while infrastructure admin 110 manages the NOS 120. However, those skilled in the art will appreciate that any of network application admin 105 and infrastructure admin 110 may be replaced by a single entity, or one or more computing modules.

According to one or more embodiments, the system depicted in FIG. 1 allows for the instantiation of multiple concurrent Network Applications, although for purposes of clarity, FIG. 1 depicts only a single instantiation of a Network Application. The communicable linkage between the southbound API 140 of the control plane 115, and the data plane API 160, allows communication from the control plane 115 to bypass to NOS 120 and communicate directly with the data plane 125.

Figure 2:
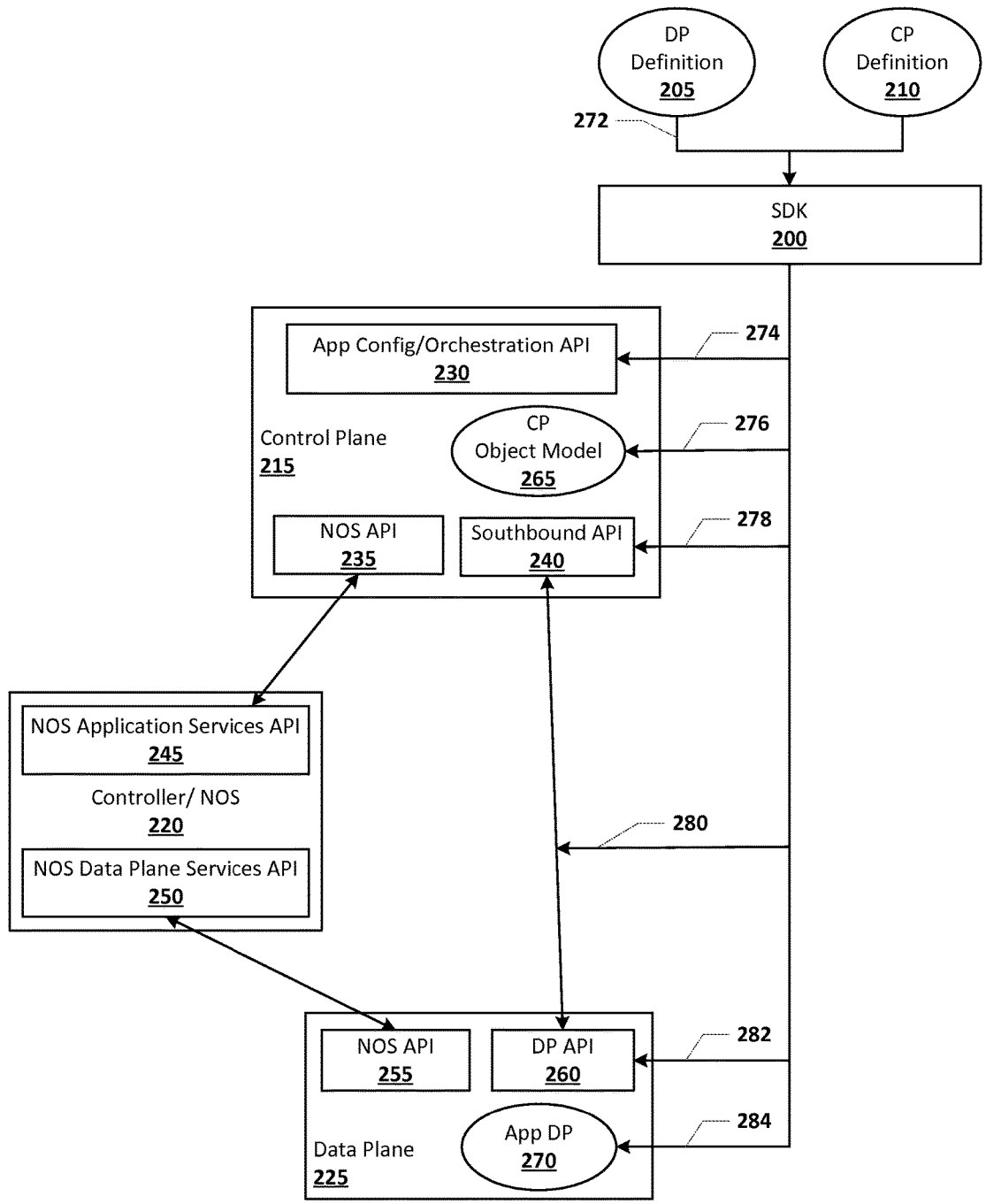
FIG. 2 shows a data flow in a network architecture in which the invention may be practiced, according to one or more embodiments.

FIG. 2 shows a flow diagram in a detailed network architecture in which the invention may be practiced, according to one or more embodiments. Specifically, FIG. 2 includes the control plane 215, NOS 220, and data plane 225, similar to those components from FIG. 1, but illustrates with more specificity the development process of the IO architecture, and also includes components used in generating a customizable network infrastructure. According to one or more embodiment, the infrastructure depicted in FIG. 2 illustrates how a software development kit (SDK) 200 may be utilized in order to customize a software-defined network environment.

According to one or more embodiments, the customizable network environment eliminates the hard link between control plane, and data plane. The customizable network environment allows for better scalability, and prevents architecture gridlock so that individual components (such as control plane or data plane) may be modified independently, as needed. In addition, the customized network architecture allows developers to track network activity, and modify network how network activity is tracked, in real time without interfering with network operation.

As depicted in FIG. 2, an SDK 200 may be utilized to generate a set of new network applications not previously envisioned when the data plane container 225 or NOS 220 were created. In one or more embodiments, SDK 200 may be used to generate a network application such as one that dynamically monitors network conditions in the network. SDK 200 includes computer readable code executable by a computer processor to provide a development tool that allows the development of a particular application, including modules that are configured to monitor network events dynamically during execution of the network. SDK 200 may be a set of tools, compilers, workflows and programmatic interface, such as an application program interface (API), or a more complete development environment to allow for generation of network applications. SDK 200 may be implemented in the form of computer code configured to be executed by a computer processor. The flow of data is enumerated within FIG. 2. However, the order each data flow is marked does not necessarily indicate the order in which data flows throughout the system. Thus, the various enumerated data flows may occur in a different order, or in parallel.

At 272, SDK receives or generates user-defined network data plane definition 205, as well as network control plane definition 210 for a particular network application. Although FIG. 2 depicts network DP definition 205, network CP definition 210, as being handled by a single instance of SDK 200, network DP definition 205 and network CP definition 210 may be generated on separate instances of SDK 200, and even by separate parties on separate computing devices across a distributed computing environment or network. According to one or more embodiments, network DP definition 205 and network CP definition 210 are generated in a domain specific language.

According to one or more embodiments, network DP definition 205 describes a customized functionality of a data plane of a network application. For example, in one or more embodiments, network DP definition 205 defines a customizable data plane component that captures a stream of network events in the data plane, and synthesizes the stream of network events to generate a modified stream of network events. In one or more embodiments, SDK 200 processes network DP definition 205 to generate network DP API 260 and customized network application data processing module 270. At 282, SDK 200 deploys network DP API 260 into data plane 225, and at 284, SDK 200 deploys customized network application data processing module 270 into data plane 225.

According to one or more embodiments, network CP definition 210 includes uncompiled computer code for object models of the control plane for the particular network application. For example, according to one or more embodiments, network CP definition 210 describes how a control plane component receives a modified stream of network events from the data plane, and correlates the modified stream of events into a correlated stream of events. In one or more embodiments, SDK 200 processes network CP definition 210 to generate a compiled network control plane object model 265, as well as network southbound API 240 and application configuration/orchestration API 230. At 274, SDK 200 deploys the orchestration API 230 into the control plane. At 276, SDK 200 deploys network CP object model 265 into control plane 215. At 278, SDK 200 deploys the network southbound API 240 into control plane 215.

In one or more embodiments, the various components of the control plane 215 and data plane 225 of a particular network application need to be linked. The link may be generated by SDK 200 as part of processing either network DP definition 205 or network CP definition 210. Alternatively, the link between the various components may be generated separately from the control plane and data plane components, and may be generated by a third party that did not generate either the control plane or data plane components. As depicted, the linked code allows the southbound API 240 and DP API 260 to become communicably connected.

In one or more embodiments, the linkage between the control plane 215 and the data plane 225 prevents the control plane 215 of a particular network application to interact with the data plane of another network application. Thus, the control plane of a first network application and the control plane of a second network application may concurrently communicate with a single data plane container to access their respective customized data processing modules. In one or more embodiments, the separation between each network application's control plane and corresponding data plane is enforced by the instructions that NOS 220 applies to data plane 225.

Figure 3:
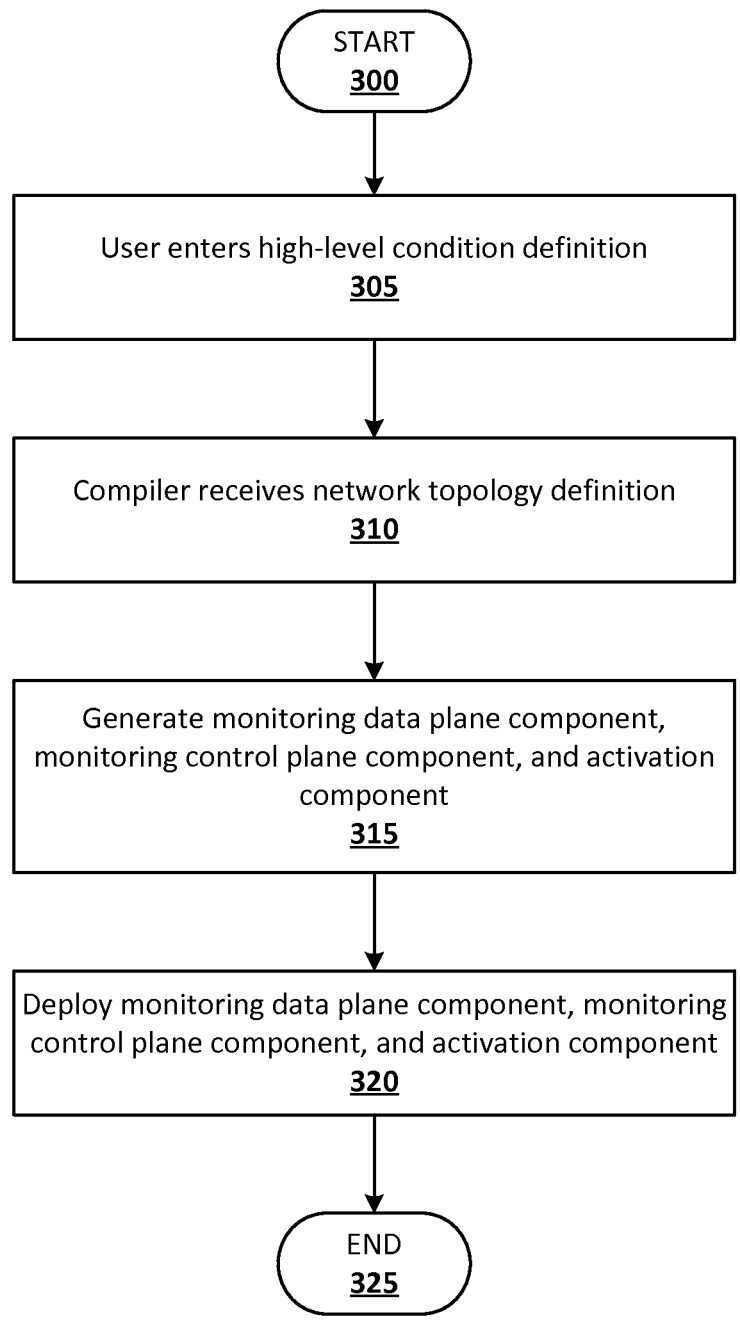
FIG. 3 shows a flow chart depicting a method for generating and deploying components for a network application according to one or more embodiments.

FIG. 3 depicts a flow chart depicting a method for generating and deploying components for a network application according to one or more embodiments. The method begins at block 300. At block 305, a user enters a high-level condition definition. In one or more embodiments, the high-level condition definition may take the form of a data plane definition, a control plane definition, or another definition that defines how control plane and/or data plane components should work to modify the function of the control plane and data plane. In one or more embodiments, the high level definition may include a network condition to be monitored in a network. In one or more embodiments, the high level definition may also include an activation definition that describes some action to occur when the network condition is met.

In one or more embodiments, the activation definition may define how to present the monitoring data to a user. For example, in one or more embodiments, the activation definition may include a visualization definition that indicates a type of visualization to display, and how to generate the visualization.

The method continues at block 310, where the software development kit (i.e., SDK 200 in FIG. 2) determines a relevant network topology definition. The network topology definition indicates a location in the network, such as a physical or logical location, where network conditions should be monitored.

At block 315 the SDK generates a monitoring data plane component (i.e., APP DP 270 of FIG. 2), monitoring control plane component (i.e., CP object model 265 of FIG. 2). The monitoring data plane component, monitoring control plane component, and the included activation component are generated by compiling the DP definition 205 and CP definition 210 of FIG. 2.

The method continues at block 320, and the SDK deploys the monitoring data plane component, monitoring control plane component, and activation component. As described above, the SDK deploys the monitoring data plane component into the data plane, and the control plane component into the control plane. The method ends at block 325.

Figure 4:
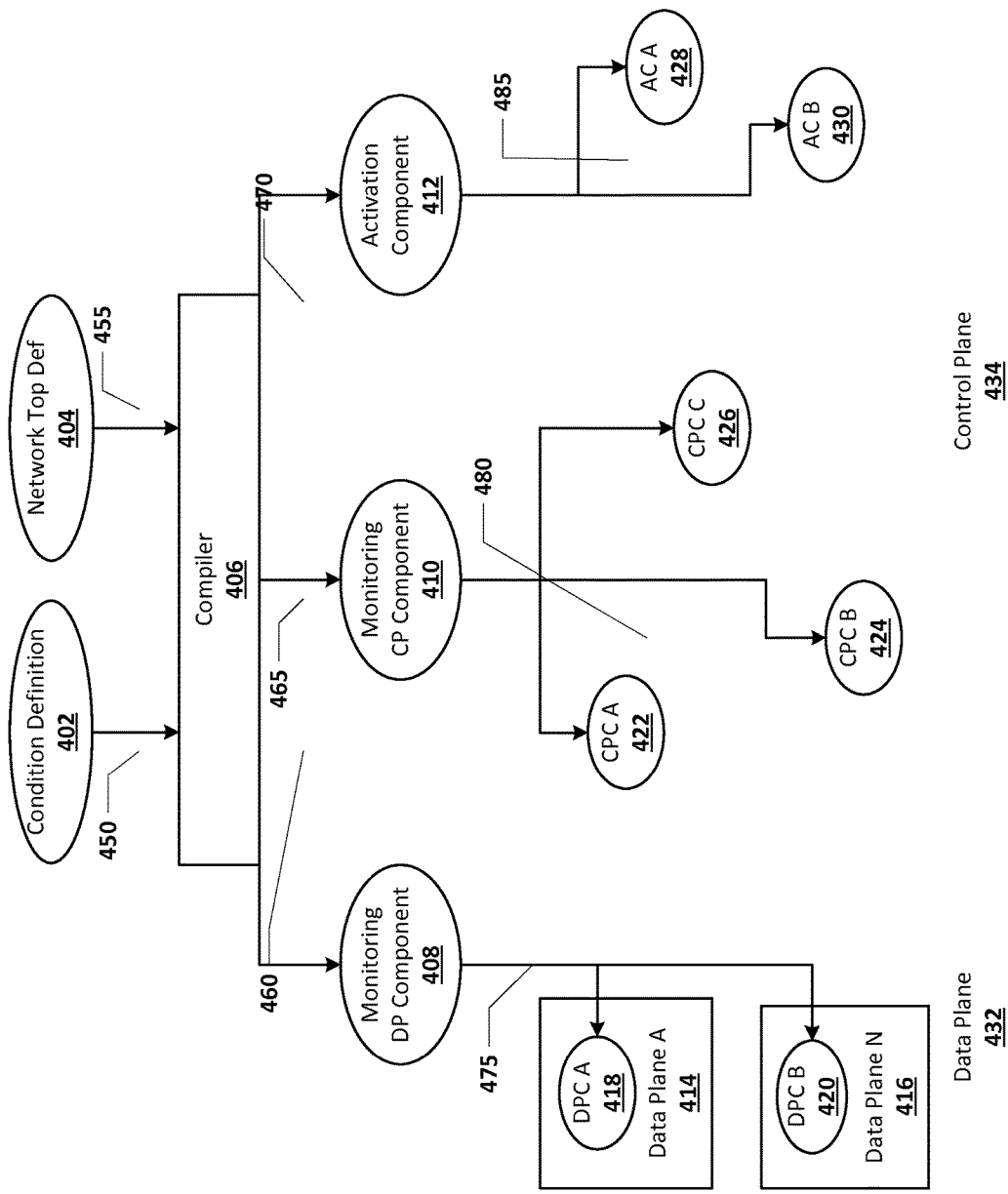
FIG. 4 shows a data flow in a network architecture in which the invention may be practiced, according to one or more embodiments.

FIG. 4 shows a data flow in a network architecture in which the invention may be practiced, according to one or more embodiments. Specifically, FIG. 3 depicts how various modules may be generated and deployed, in one or more embodiments of the invention.

The system includes a compiler 400, which generates and deploys the various components to a data plane 432, control plane 434, and trigger execution 436. At 405, the compiler 406 receives a condition definition 402, and at 455, compiler definition receives network topology 404. In one or more embodiments, condition definition 402 indicates a network condition to be monitored. The condition definition may be generated via automated process, or may be received from a user. Condition definition 402 defines the events or set of events in the network that are of interest to a user. In addition, the condition definition 402 may define how network events of interest should be aggregated, correlated, and visualized. In addition, in one or more embodiments, condition definition 402, may define a trigger, such as a user action, that should be executed when certain network conditions are met. For example, in one or more embodiments, the trigger, upon execution, may alert the user to the system condition, run a system command, or perform some other user-defined instruction.

Network topology 404 includes information regarding the network location from which the network events should be extracted. In one or more embodiments, the network topology may indicate a physical or a logical location within the network.

Compiler 406 compiles the condition definition 402 and the network topology 404 to generate a monitoring data plane component 408 at 460, monitoring control plane component 410 at 465, and activation component 412 at 470. Compiler 406 may generate one or more of the monitoring DP component 408, monitoring CP component 410, and activation component 412. In addition, compiler 406 may generate one or more instances of each of the monitoring DP component 408, monitoring CP component 410, and activation component 412.

As described above, the monitoring DP component 408 is configured to capture, and in one or more embodiments aggregate and mirror to the control plane 434, events selected based on the monitoring conditions defined in condition definition 408 in locations in the data plane 432 defined by network topology 404. At 475, the various instances of the monitoring DP component 408 are deployed in the various network locations defined in network topology 404. The example depicted in FIG. 4 shows that data plane component A (DPC A) 418 is deployed in Data Plane A 414, and DPC B 420 is deployed in Data Plane N 416. Because the data plane component is generated by using the data plane abstraction technology explained in FIG. 1 and FIG. 2 above, DPC A 418 and DPC B 418 may be inserted into the network in real time. Thus, the data plane components can be inserted without interruption of network activity, and without resulting in packet loss.

At 480, the various instances of monitoring CP component 410 are deployed in the control plane 434. In the example depicted in FIG. 4, the various instances include control plane component (CPC) A 422, CPC B 424, and CPC C 426. In one or more embodiments, the various instances of the monitoring control plane component are configured to perform aggregation on packets streams received from the various monitoring data plane components, and transmit the resulting stream to the activation component 412. For example, in one or more embodiments, a particular CPC may receive data streams from multiple data plane components. The particular CPC may then aggregate the multiple data streams to remove redundant events prior to providing the correlated stream to the activation component.

At 485, the various instances of activation component 412 are deployed during action execution 436. In the example depicted in FIG. 4, the various instances include activation component (AC) A 428 and AC B 430. One or both of AC A 428 and AC B 430 receive packet streams from one or more of CPC A 422, CPC B 424, and CPC C 426. One or more of AC A 428 and AC B 430 may be configured to determine when a particular network condition is met based on the incoming packet stream, and trigger some action based on the activation definition. In one or more embodiments, the activation definition may define a particular visualization that should be generated based on a visualization definition defined in condition definition 402. In one or more embodiments, activation definition may define a trigger that should be executed when network conditions are met based on the packet stream, such as alerting a user to the network condition, running a system command, or some other activity.

Figure 5:
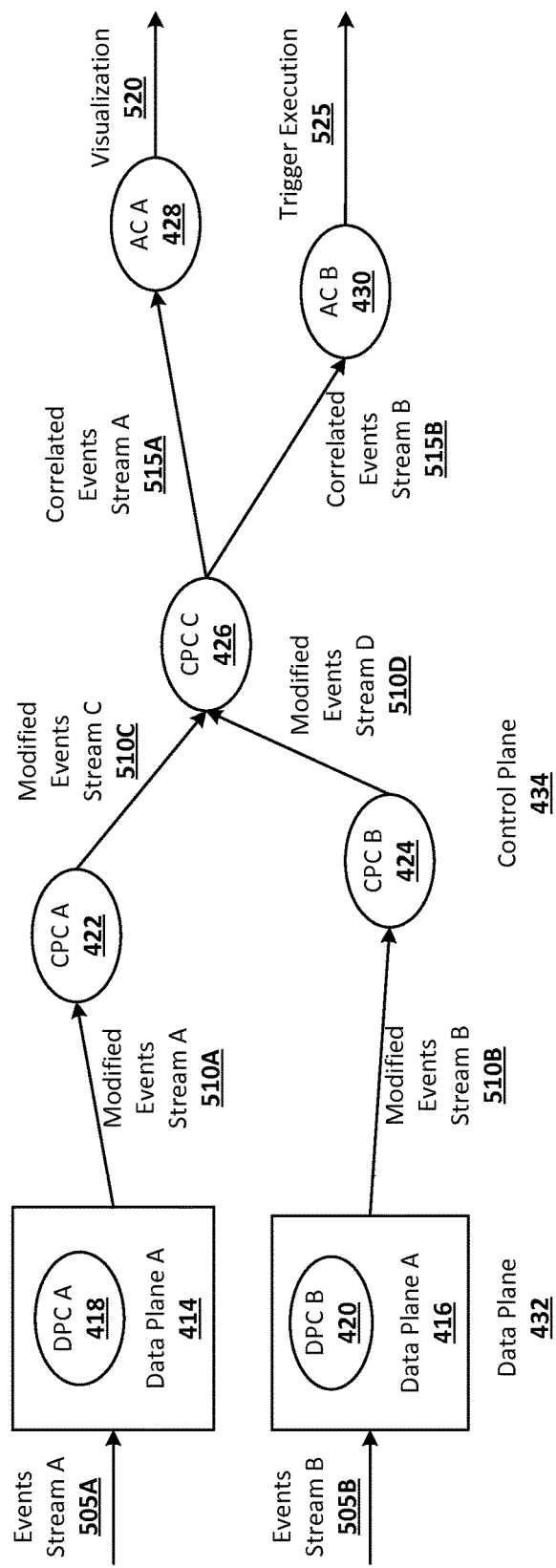
FIG. 5 shows a data flow in a network architecture in which the invention may be practiced, according to one or more embodiments.

FIG. 5 shows a data flow in a network architecture in which the invention may be practiced, according to one or more embodiments. Specifically, FIG. 5 depicts packet movement through the system depicted in FIG. 4, according to one or more embodiments. Those skilled in the art will appreciate that the particular depiction in FIG. 5 is shown merely for example and the exact configuration of the various components is not particularly intended to limit the claims.

The data flow begins with events (packet, data) stream 505 A and events stream 505B. Events stream 505A is captured by DPC A 418, while events stream B 505 B is captured by DPC B 420. Each of DPC A 418 and DPC B may modify their respective captured events streams in a unique way, and transmit the modified events streams to control plane 434. Each of DPC A 418 and DPC B 420 synthesizes the captured event streams based on the condition definition 402 to generate a modified stream of events. DPC A 418 transmits modified events stream A 510A to CPC A 422, and DPC B 420 transmits modified events stream B 510B to CPC B 424.

CPC A 422 and CPC B 424 may then receive the modified streams of network events and correlate the data streams into a correlated stream of network events. As depicted, correlation may require multiple control plane components. In this example, correlation requires a first step by CPC A 422 and CPC B 424, further modifying their respective received modified events streams to generate modified events stream C 510 C and modified events stream D 510 D, Final correlation occurs when CPC C 426 receives modified events stream C 510 C and modified events stream D 510 D. CPC C 426 then generates a correlated events stream 515 and transmits the correlated events stream 515 to AC A 428 and AC B 430.

For purposes of the example depicted in FIG. 5, AC A 428 generates a visualization of the correlated events stream. In one or more embodiments, AC A 428 presents the correlated stream of events in a visualization type defined by a visualization definition defined in the condition definition 402. The resulting visualization 520 is then presented to the user. Because AC A 428 continues to dynamically receive a correlated data stream during execution of the network, AC A 428 may modify visualization 520 in real time to reflect real time changes in the network.

For purposes of the example depicted in FIG. 5, AC B 430 causes a trigger execution based on the correlated events stream. In one or more embodiments, AC B 430 triggers execution of a user action 525 executed when a particular monitored network event is present in correlated events stream 515.

Figure 6:
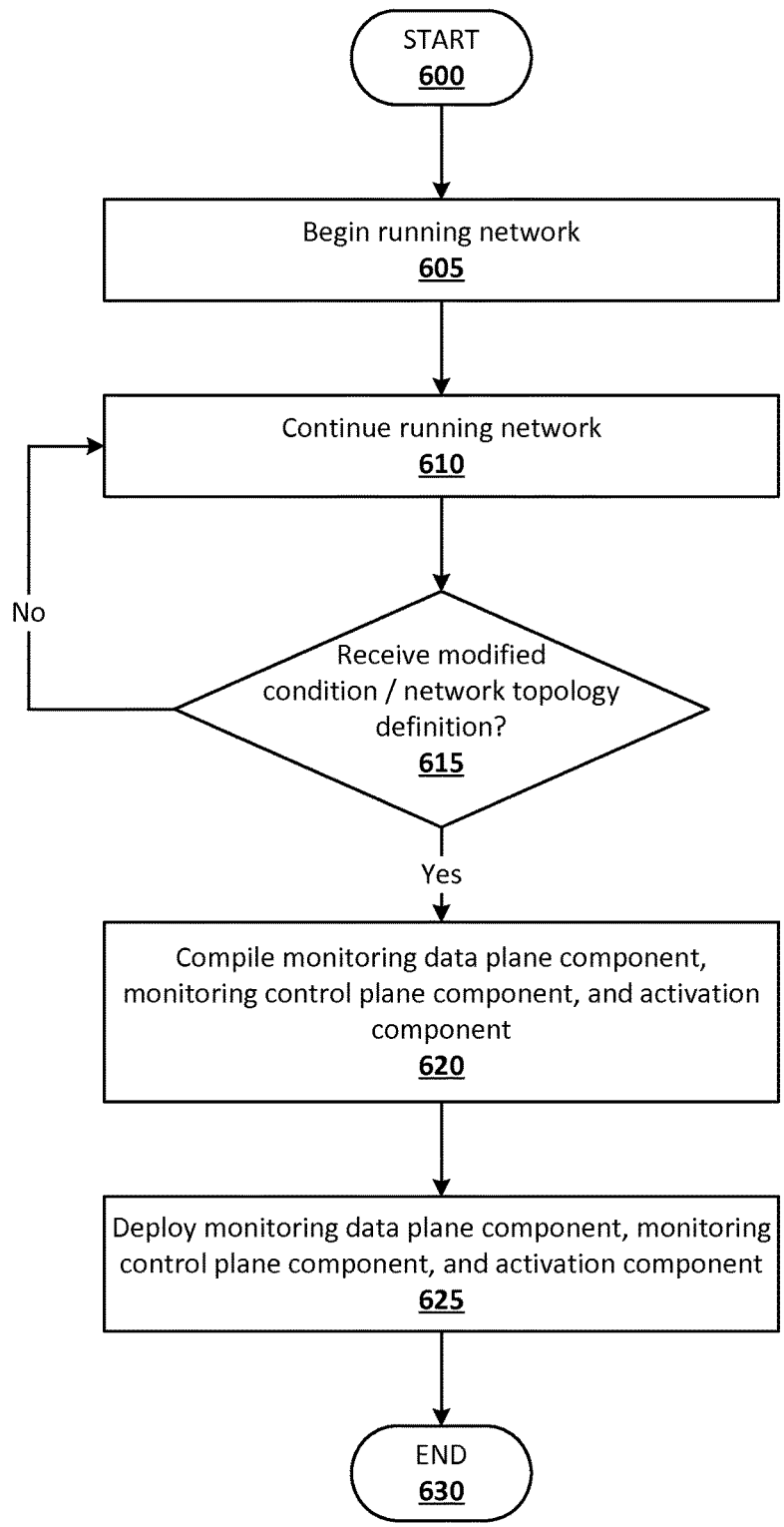
FIG. 6 shows a flow chart depicting a method for modifying network components for a network application according to one or more embodiments.
Figure 7:
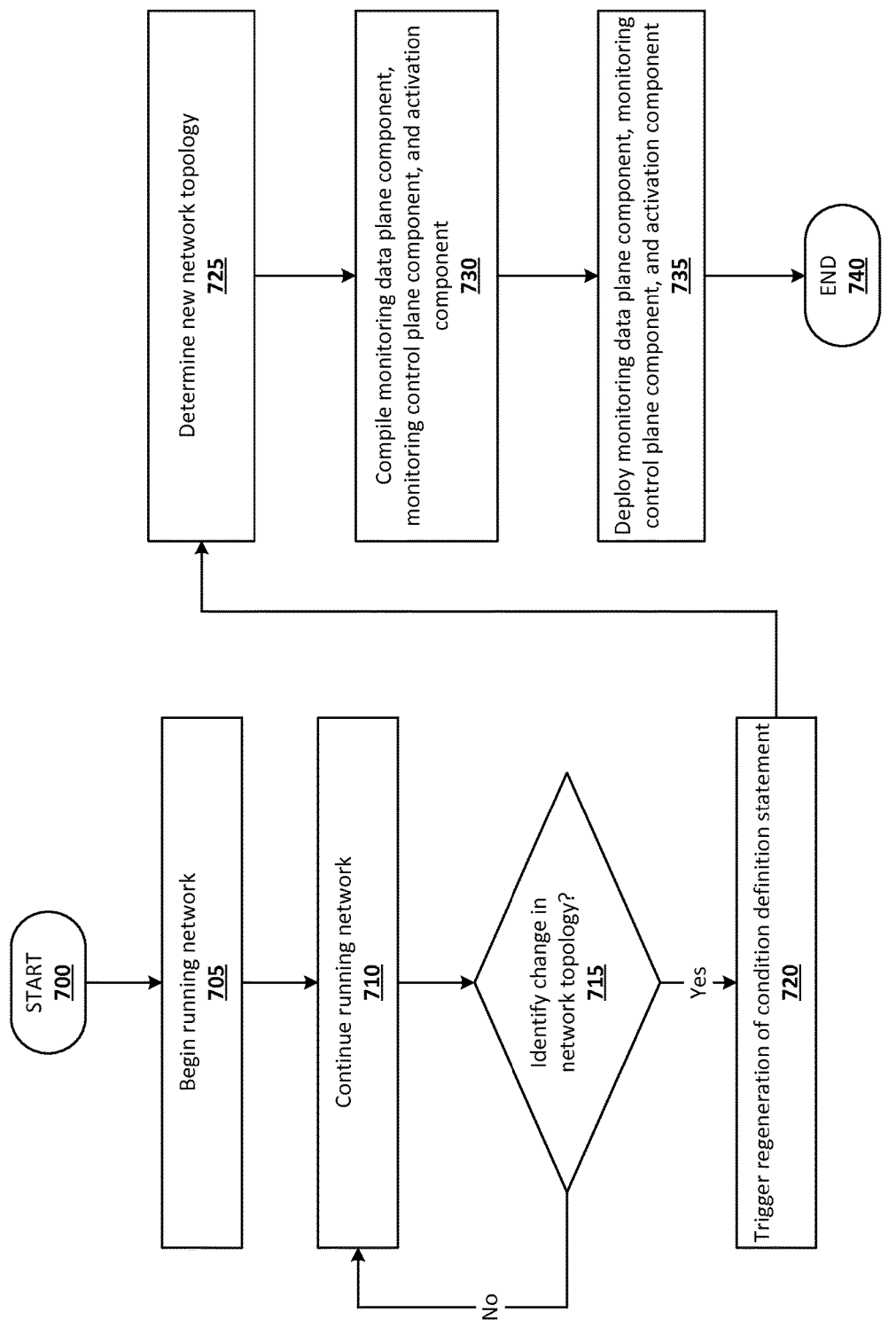
FIG. 7 shows a flow chart depicting a method for modifying network components for a network application in real time according to one or more embodiments.

FIGS. 6-7 depict flow charts illustrating various aspects of the invention. The flow charts include various steps depicted in a particular order, although in one or more embodiments the various steps may be performed in a different order, or perhaps simultaneously. For purposes of clarify, citation will be made to FIG. 4. However, any indication that a particular step is performed by a particular module depicted in FIG. 4 is merely for exemplary purposes and is not necessarily intended to limit the scope of the disclosure.

FIG. 6 shows a flow chart depicting a method for modifying network components for a network application in real time according to one or more embodiments. Specifically, FIG. 6 depicts a method for modifying monitoring control plane components, monitoring data plane components, and activation components, based on a change in condition definition or network topology definition from a user.

The method begins at block 600. At 605, the network begins running. At block 610, the network continues to run, and at block 615 a determination is made whether a modified condition definition or network topology definition is received. In one or more embodiments, a user may enter a modified condition definition if, for example, the user wanted to modify what network activity is monitored, or modify the visualization or activation component to cause a different activity to occur when monitored network conditions are met. In one or more embodiments, the user may modify the network topology definition if the user wants to modify where in the network a particular network activity is monitored. If a modified condition definition or network topology definition is not received, then the method continues at block 610, and the network continues to run as previously.

If, at block 615, a modified condition definition or network topology definition is received, then the method continues at block 620. Because the disclosure allows for the various components to be added, removed, or replaced in real time due to the abstraction technology described with respect to FIGS. 1-2 above, the network continues running. At block 620, the compiler generates one or more of modified monitoring data plane components, monitoring control plane components, and modified activation components. At block 625, the one or more of modified monitoring data plane components, monitoring control plane components, and modified activation components are deployed into the various locations as determined by the network topology definition or modified network topology definition, without interrupting network activity. The method ends at block 630.

FIG. 7 shows a flow chart depicting a method for modifying network components for a network application in real time according to one or more embodiments. Specifically, FIG. 7 depicts a method for modifying monitoring control plane components, monitoring data plane components, and activation components, based on a change in network topology.

The method begins at block 700. At 705, the network begins running. At block 710, the network continues to run, and at block 715 a determination is made whether a change in network topology has occurred. A change in network topology may occur, for example, if data planes are added or removed, or control planes are added or removed. If no change in network topology is detected, then the method continues at block 710, and the network continues to run as previously.

If, at block 715, a modified condition definition or network topology definition is received, then the method continues at block 720. Because the disclosure allows for the various components to be added, removed, or replaced in real time due to the abstraction technology described with respect to FIGS. 1-2 above, the network continues running. At block 720, regeneration of the condition definition is triggered, and at block 720, the new network topology is determined in relation to the network topology definition. The method continues at block 730 and the compiler generates one or more of modified monitoring data plane components, monitoring control plane components, and modified activation components. At block 735, the one or more of modified monitoring data plane components, monitoring control plane components, and modified activation components are deployed into the various locations as determined by the network topology definition or modified network topology definition, without interrupting network activity. The method ends at block 740.

In each of the flow charts described above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Figure 8:
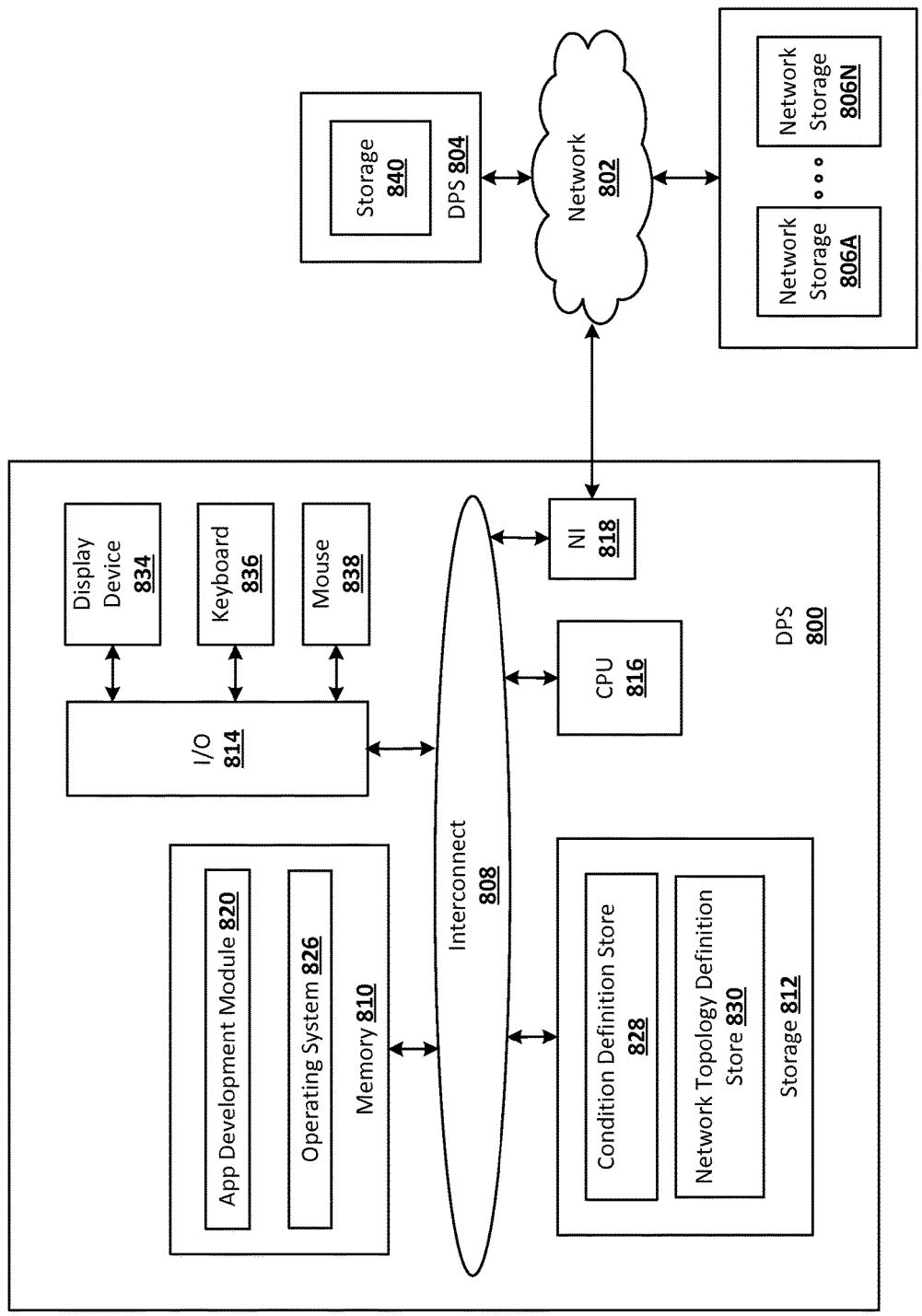
FIG. 8 depicts an example data processing system for a host in the network storage architecture, according to one or more embodiments of the invention.

FIG. 8 depicts an example data processing system for a host in the network architecture, according to one or more embodiments of the invention. Specifically, FIG. 8 depicts an example DPS 800 communicable with another DPS 804, or network storage 806A-806N across a network 802, within which the functional aspects of the described embodiments may advantageously be implemented. In one or more embodiments, a user may develop network applications using DPS 800.

DPS 800 includes numerous components logically connected by Interconnect 808. Specifically, FIG. 8 depicts DPS 800 including Memory 810, central processing unit (CPU) 816 (also interchangeably referred to as a processor), Storage 812, Input/Output (I/O) controller 814, and network interface card (NIC) 818. In addition, FIG. 8 depicts that DPS 800 may be connected via NIC 818 to Network Storage 806A-806N and a second DPS 804 across Network 802.

Those skilled in the art will appreciate that CPU 816 can also be any kind of hardware processor. I/O controller 814 allows a user to interface with DPS 800. As depicted, I/O controller 814 provides an interface for such devices as Display Device 834, Keyboard 836, and Mouse 838. According to one or more embodiments, Display Device 834 may include output means such as a liquid crystal display (LCD), a plasma display, a cathode ray tube (CRT) monitor, or any other kind of display device.

Memory 810 may be random access memory (RAM), cache memory, flash memory, or any other kind of storage structure that is configured to store computer instructions/code executable by CPU 816 and/or data utilized during such execution. As depicted, Memory 810 includes Operating System 826. Operating System 826 may be any platform that manages the execution of computer code and manages hardware resources.

Memory 810 also includes a plurality of functional modules, such as application development module 820. It is appreciated that one or more of these modules can be distributed across network 802.

As depicted, DPS 800 also includes Storage 812. Storage 812 may be any kind of computer storage device, such as a hard disk, an optical drive such as a compact disk drive or digital video disk (DVD) drive, and a flash memory drive. Storage 812 may include such data as a condition definition store 828, and a network topology store 830.

Those skilled in the art will appreciate that the software aspects of an illustrative embodiment of the present invention are capable of being distributed as a computer program product in a variety of forms, and that an illustrative embodiment of the present invention applies equally regardless of the particular type of computer-readable storage device used to actually store the software aspects of the invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for monitoring network conditions, the method comprising:
    compiling, by a software development module, a first condition definition to generate a first data plane component, a first control plane component, and an activation component, the first condition definition describing a first network condition to be monitored in a network and an activation definition;
    deploying, by the software development module, the first data plane component in real time into a data plane of the network, wherein the first data plane component captures a first stream of network events as described in the first condition definition without interruption of network activity and without resulting in packet loss, and the first data plane component synthesizes the first stream of network events to generate a first modified stream of network events;
    deploying, by the software development module, the first control plane component into a control plane of the network, wherein the first control plane component receives the first modified stream of network events and correlates the first modified stream of network events into a correlated stream of events; and deploying, by the software development module, the activation component, wherein the activation component, upon receiving the correlated stream of events, initiates the activation definition.

2. The method of claim 1, wherein the initiation of the activation definition includes a visualization that presents the correlated stream of events in a visualization type defined by a visualization definition.

3. The method of claim 2, wherein the activation component modifies the visualization dynamically during operation of the network to reflect real-time changes in the network.

4. The method of claim 1, wherein the first network condition is monitored in the network at a location identified in a network topology definition, and further including, during operation of the network:
 determining that the network topology has been modified to a modified network topology; and
 in response to determining that the network topology has been modified:
  recompiling, by the software development module, the first condition definition to generate a first modified data plane component, a first modified control plane component, and a first modified activation component;
  replacing, by the software development module, the first data plane component with the first modified data plane component;
  replacing, by the software development module, the first control plane component with the first modified control plane component; and
  replacing, by the software development module, the activation component with the first modified activation component.

5. The method of claim 1,
wherein the first condition definition further includes a trigger description that describes a user-defined executable instruction, and
wherein the activation component is further to:
 determine that the first network condition is met, and
 in response to determining that the first network condition is met, execute the user-defined executable instruction.

6. The method of claim 2, further including:
in response to a modified activation definition:
 generating, by the software development module, a modified activation component to reflect the modified activation definition, and
 deploying, by the software development module, the modified activation component to replace the activation component, wherein the modified activation component generates a modified visualization in real time during operation of the network.

7. The method of claim 1, wherein the first control plane component is a monitoring control plane component including a second control plane component, a third control plane component and a fourth control plane component, the second control plane component determines a second modified stream of network events from the first modified stream of network events received from the first data plane component, the third control plane component determines a fourth modified stream of network events from a third modified stream of network events received from a second data plane component at a different network topology location in the network than the first data plane component, and the fourth control plane component correlates the second modified stream of network events and the fourth modified stream of network events to determine the correlated stream of events.

8. A system for monitoring network conditions, the system comprising:
a processor; and
a computer readable storage device, the computer readable storage device including computer code which, when executed by the processor, causes the processor to implement a software development module to at least:
 compile a first condition definition to generate a first data plane component, a first control plane component, and an activation component, the first condition definition describing a first network condition to be monitored in a network and an activation definition;
 deploy the first data plane component into a data plane of the network, wherein the first data plane component captures a first stream of network events as described in the first condition definition, and the first data plane component synthesizes the first stream of network events to generate a first modified stream of network events;
 deploy the first control plane component into a control plane of the network, wherein the first control plane component receives the first modified stream of network events and correlates the first modified stream of network events into a correlated stream of events; and
 deploy the activation component, wherein the activation component, upon receiving the correlated stream of events, initiates the activation definition.

9. The system of claim 8, wherein initiation of the activation definition includes a visualization that presents the correlated stream of events in a visualization type defined by a visualization definition.

10. The system of claim 9, wherein the activation component modifies the visualization dynamically during operation of the network to reflect real-time changes in the network.

11. The system of claim 8, wherein the first network condition is monitored in the network at a location identified in a network topology definition, and the computer readable storage device further includes computer code which, when executed by the processor during operation of the network, causes the processor to:
 in response to determining that the network topology has been modified:
  recompile the first condition definition to generate a first modified data plane component, a first modified control plane component, and a first modified activation component;
  replace the first data plane component with the first modified data plane component;
  replace the first control plane component with the first modified control plane component; and
  replace the activation component with the first modified activation component.

12. The system of claim 8,
wherein the first condition definition further includes a trigger description that describes a user-defined executable instruction, and
wherein the activation component is further to:
 determine that the first network condition is met, and
 in response to determining that the first network condition is met, execute the user-defined executable instruction.

13. The system of claim 8, the computer readable storage device further including computer code which, when executed by the processor during operation of the network, causes the processor to:
   in response to a modified activation definition:
      generate a modified activation component to reflect the modified activation definition, and
      deploy the modified activation component to replace the activation component, wherein the modified activation component generates a modified visualization in real time during operation of the network.

14. The system of claim 8, wherein the first control plane component is a monitoring control plane component including a second control plane component, a third control plane component and a fourth control plane component, the second control plane component determines a second modified stream of network events from the first modified stream of network events received from the first data plane component, the third control plane component determines a fourth modified stream of network events from a third modified stream of network events received from a second data plane component at a different network topology location in the network than the first data plane component, and the fourth control plane component correlates the second modified stream of network events and the fourth modified stream of network events to determine the correlated stream of events.

15. A computer program product for monitoring network conditions, the computer program product comprising a computer readable storage device comprising computer code which, when executed by a processor, causes the processor to implement a software development module to at least:
   compile a first condition definition to generate a first data plane component, a first control plane component, and an activation component, the first condition definition describing a first network condition to be monitored in a network and an activation definition;
   deploy the first data plane component into a data plane of the network, wherein the first data plane component captures a first stream of network events as described in the first condition definition, and the first data plane component synthesizes the first stream of network events to generate a first modified stream of network events;
   deploy the first control plane component into a control plane of the network, wherein the first control plane component receives the first modified stream of network events and correlates the first modified stream of network events into a correlated stream of events; and
   deploy the activation component, wherein the activation component, upon receiving the correlated stream of events, initiates the activation definition.

16. The computer program product of claim 15, wherein initiation of the activation definition includes a visualization that presents the correlated stream of events in a visualization type defined by a visualization definition.

17. The computer program product of claim 16, wherein the activation component modifies the visualization dynamically during operation of the network to reflect real-time changes in the network.

18. The computer program product of claim 15, wherein the first network condition is monitored in the network at a location identified in a network topology definition, and the computer readable storage device further includes computer code which, when executed by the processor during operation of the network, causes the processor to:
   determine that a network topology of the network has been modified to a modified network topology; and
   in response to determining that the network topology has been modified:
      recompile the first condition definition to generate a first modified data plane component, a first modified control plane component, and a first modified activation component;
      replace the first data plane component with the first modified data plane component;
      replace the first control plane component with the first modified control plane component; and
      replace the activation component with the first modified activation component.

19. The computer program product of claim 15, the computer readable storage device further including computer code which, when executed by the processor during operation of the network, causes the processor to:
   in response to a modified activation definition:
      generate a modified activation component to reflect the modified activation definition, and
      deploy the modified activation component to replace the activation component, wherein the modified activation component generates a modified visualization in real time during operation of the network.

20. The computer program product of claim 15, wherein the first control plane component is a monitoring control plane component including a second control plane component, a third control plane component and a fourth control plane component, the second control plane component determines a second modified stream of network events from the first modified stream of network events received from the first data plane component, the third control plane component determines a fourth modified stream of network events from a third modified stream of network events received from a second data plane component at a different network topology location in the network than the first data plane component, and the fourth control plane component correlates the second modified stream of network events and the fourth modified stream of network events to determine the correlated stream of events.

\* \* \* \* \*